US006987543B1

(12) United States Patent
Mogre et al.

(10) Patent No.: US 6,987,543 B1
(45) Date of Patent: Jan. 17, 2006

(54) SYSTEM TO EFFICIENTLY TRANSMIT TWO HDTV CHANNELS OVER SATELLITE USING TURBO CODED 8PSK MODULATION FOR DSS COMPLIANT RECEIVERS

(75) Inventors: Advait M. Mogre, Sunnyvale, CA (US); Dojun Rhee, Irvine, CA (US)

(73) Assignee: LSI Logic Corporation, Milpitas, CA (US)

( * ) Notice: Subject to any disclaimer, the term of this patent is extended or adjusted under 35 U.S.C. 154(b) by 674 days.

(21) Appl. No.: 09/726,819

(22) Filed: Nov. 30, 2000

(51) Int. Cl.
*H04N 5/40* (2006.01)
*H04L 7/04* (2006.01)

(52) U.S. Cl. ...................... 348/608; 375/262
(58) Field of Classification Search ............ 348/426.1, 348/469, 473, 432.1, 433.1, 475, 725, 726, 348/21, 723, 724; 375/261, 262, 265, 295, 375/298, 308; 714/786, 787, 790, 792
See application file for complete search history.

(56) References Cited

U.S. PATENT DOCUMENTS

| | | | | |
|---|---|---|---|---|
| 5,446,747 A | | 8/1995 | Berrou | 371/45 |
| 5,583,889 A | * | 12/1996 | Citta et al. | 375/341 |
| 5,604,541 A | * | 2/1997 | Kim et al. | 348/426 |
| 5,923,711 A | * | 7/1999 | Willming | 375/287 |
| 5,987,070 A | * | 11/1999 | Fimoff et al. | 375/286 |
| 6,061,387 A | * | 5/2000 | Yi | 375/142 |
| 6,094,427 A | * | 7/2000 | Yi | 370/331 |
| 6,166,667 A | * | 12/2000 | Park | 341/94 |
| 6,201,563 B1 | * | 3/2001 | Rhee | 348/21 |
| 6,370,669 B1 | * | 4/2002 | Eroz et al. | 714/774 |
| 6,392,572 B1 | * | 5/2002 | Shiu et al. | 341/81 |
| 6,400,290 B1 | * | 6/2002 | Langhammer et al. | 341/94 |
| 6,529,558 B1 | * | 3/2003 | Fimoff et al. | 375/262 |
| 6,542,558 B1 | * | 4/2003 | Schulist et al. | 375/340 |
| 2004/0105403 A1 | * | 6/2004 | Lin et al. | 370/316 |

OTHER PUBLICATIONS

Bit-Interleaved Coded Modulation with Iterative Decoding—Approaching Turbo-TCM Performance without Code Concatenation, By Xiaodong Li and James A. Ritcey, Proceedings 1998 Conference on Information and System Science (Princeton), Mar. 1998 pp. 1-7.
Bit-Interleaved Coded Modulation with Iterative Decoding, By Xiaodong Li and James A. Ritcey, IEEE Communications Letters, vol. 1, No. 6, Nov. 1997, pp. 169-171.

* cited by examiner

*Primary Examiner*—Paulos M. Natnael
(74) *Attorney, Agent, or Firm*—Christopher P. Maiorana PC

(57) ABSTRACT

A channel encoding system and a channel decoding system for use in transmitting multiple high definition television programs in a single satellite channel. The channel encoding system may comprise a frame formatter that may be configured to format a transport stream to produce a block stream. An error correction encoder may be configured to encode the block stream to produce an error protected block stream. An interleave module may be configured to interleave the error protected block stream to produce a data stream. A turbo encoder may be configured to encode the data stream to produce an encoded stream. A bit-to-symbol mapper may be configured to map the encoded stream to produce a symbol stream capable of at least eight different symbols. Finally, a modulator may be configured to modulate the symbol stream.

20 Claims, 8 Drawing Sheets

SYSTEM TO EFFICIENTLY TRANSMIT TWO HDTV CHANNELS OVER SATELLITE USING TURBO CODED 8PSK MODULATION FOR DSS COMPLIANT RECEIVERS

FIELD OF THE INVENTION

The present invention relates to a method and/or architecture for implementing a digital video satellite transmission system generally and, more particularly, to a method and/or architecture for implementing a satellite system channel encoder and channel decoder for direct broadcast satellite transmissions as a carrier for high definition television programming.

BACKGROUND OF THE INVENTION

Existing direct broadcast satellite systems have difficulty transmitting two programs of high definition television (HDTV) simultaneously in a single channel. For example, the Integrated Services Digital Broadcasting-Satellite (ISDB-S) standard employs an eight phase shift keying (8PSK) based system that requires expanded bandwidth and increased transmission power to accommodate two HDTV programs simultaneously. Standards with conventional quadrature phase shift keying (QPSK) based systems, such as the Digital Satellite System (DSS®) and the Digital Video Broadcast-Satellite (DVB-S) systems, also lack the bandwidth and available transmit power to accommodate two simultaneous HDTV programs.

It would be desirable to broadcast two HDTV programs simultaneously in a single direct broadcast satellite channel while remaining within existing bandwidth and power constraints. This would allow the existing constellation of satellites and home-based antenna systems to remain unmodified while doubling the programming capability of the system.

SUMMARY OF THE INVENTION

The present invention concerns a channel encoding system and a channel decoding system for use in transmitting multiple high definition television programs in a single satellite channel. The channel encoding system may comprise a frame formatter that may be configured to format a transport stream to produce a block stream. An error correction encoder may be configured to encode the block stream to produce an error protected block stream. An interleave module may be configured to interleave the error protected block stream to produce a data stream. A turbo encoder may be configured to encode the data stream to produce an encoded stream. A bit-to-symbol mapper may be configured to map the encoded stream to produce a symbol stream capable of at least eight different symbols. Finally, a modulator may be configured to modulate the symbol stream.

The objects, features and advantages of the present invention include providing a method and/or architecture for implementing a satellite system that transmits two HDTV programs substantially simultaneously in a single direct broadcast satellite channel.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
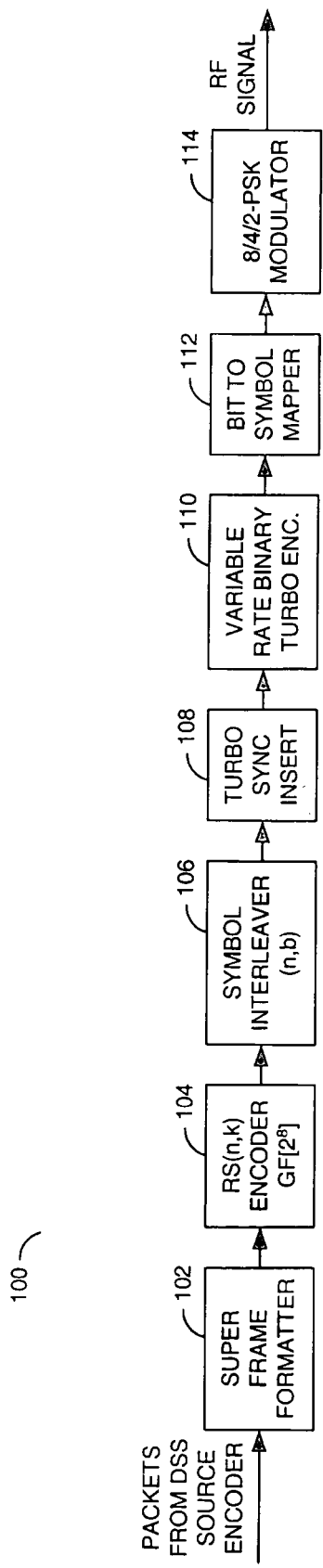
FIG. 1 is a block diagram of an example channel encoding system that implements the present invention.

FIG. 1 shows a block diagram of an example channel encoding system 100 implemented in accordance with the present invention. The channel encoding system 100 generally comprises a super frame formatter 102, an encoder 104, an interleaver 106, a turbo synchronization inserter 108, a variable rate turbo encoder 110, a bit-to-symbol mapper 112, and a modulator 114. Packets from a Digital Satellite System (DSS®) (DIRECTV, Inc., El Segundo Calif.), Digital Video Broadcast-Satellite system (DVB-S) (Standard EN 300 421, European Telecommunications Standards Institute, Valbonne, France) or other suitable digital video source are provided as input to the channel encoding system 100. This sequence of digital video packets is referred to as a transport stream. The transport stream may contain, but is not limited to, a combination of one or more standard television or high definition television (HDTV) programs. The channel encoding system 100 may output a radio frequency (RF) signal suitable for amplification and broadcasting to a satellite (not shown).

Operation of the channel encoding system 100 is partially based on a family of codes known as Turbo codes. Turbo codes, also known as parallel concatenated convolutional codes, are described in U.S. Pat. No. 5,446,747 issued to Berrou on Aug. 29, 1995, which is hereby incorporated by reference in its entirety.

Figure 2:
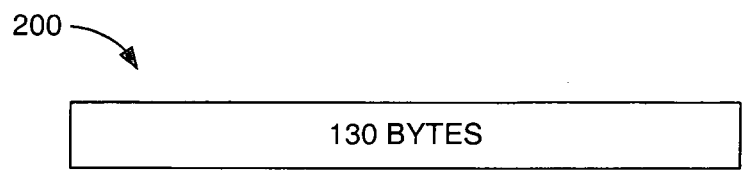
FIG. 2 is a diagram of a payload packet structure.

Referring to FIG. 2, the channel encoding system 100 generally receives a sequence of data bytes in the transport stream. The data bytes may be arranged in a payload packet 200 structure wherein each payload packet 200 contains one hundred thirty (130) data bytes.

Figure 3:
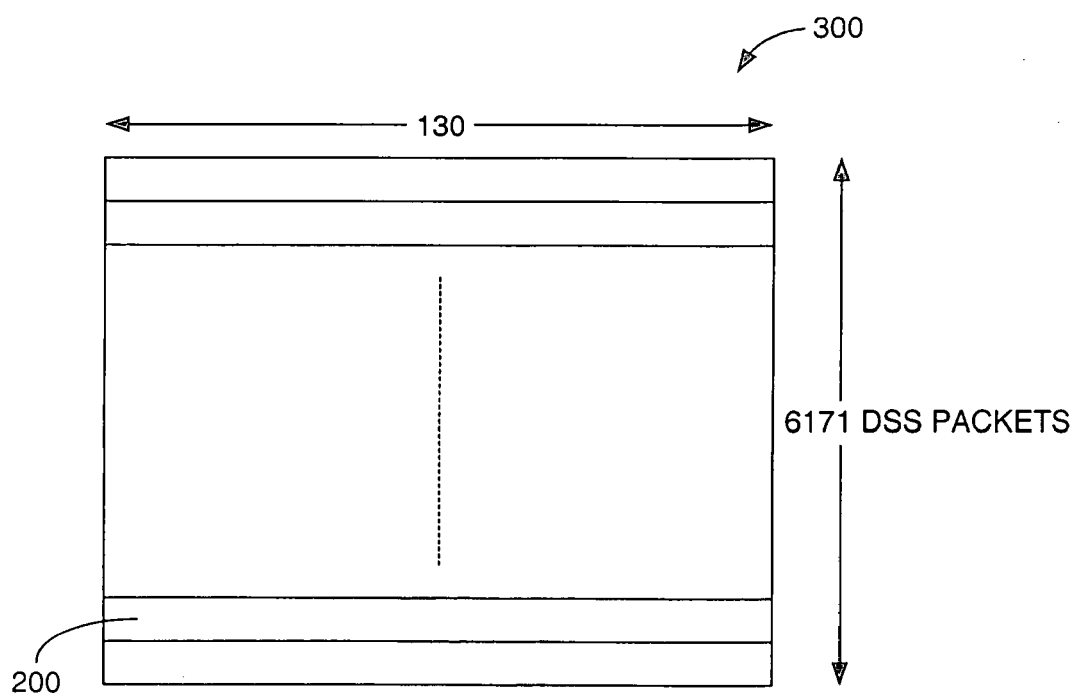
FIG. 3 is a diagram of a data frame.

Referring to FIG. 3, the payload packets 200 may be arranged in data frames 300. There may be 6171 payload packets 200 in each data frame 300. In other words, each data frame 300 may contain 130×6171 =802,230 data bytes.

Figure 4:
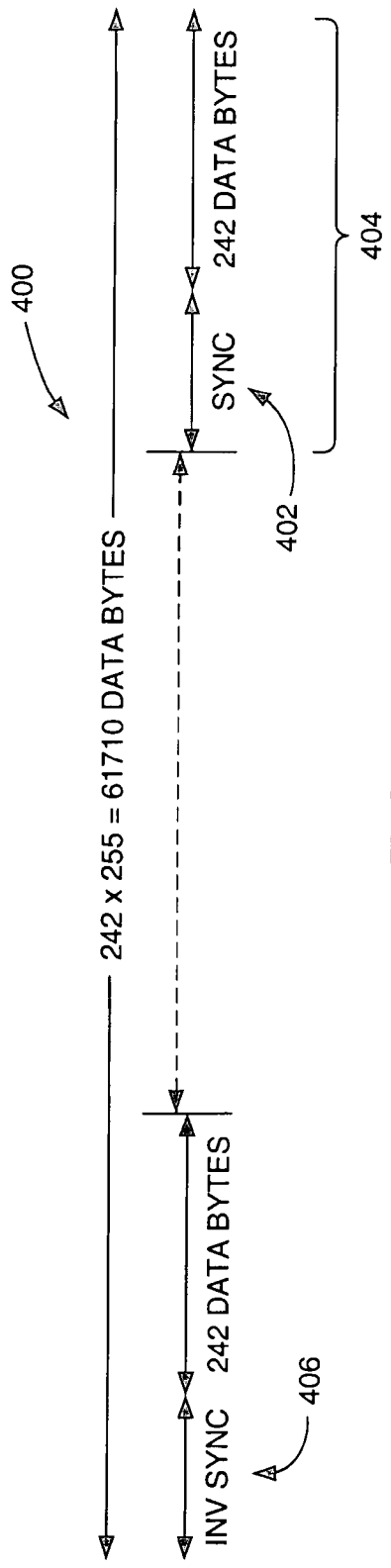
FIG. 4 is a diagram of a block of data.

Referring to FIG. 4, the super frame formatter 102 generally begins formatting the data bytes of the data frames 300 by inserting a synchronization byte 402 before every two hundred forty-two (242) data bytes. The combination of synchronization byte 402 and two hundred forty-two (242) data bytes forms one block 404. A sub-frame 400 may be defined as a predetermined number of sequential blocks 404. In the preferred embodiment, each sub-frame 400 may have two hundred fifty-five (255) blocks 404. Other predetermined numbers of blocks 404 may be employed.

The first synchronization byte 406 of each sub-frame 400 may be bit-wise inverted to make it distinguishable from the remaining synchronization bytes 402 in the sub-frame 400. In the preferred embodiment, the synchronization bytes 402 generally have a 1D hexadecimal value while the inverted first synchronization byte 406 generally has an E2 hexadecimal value. Other hexadecimal values may be used.

Figure 5:
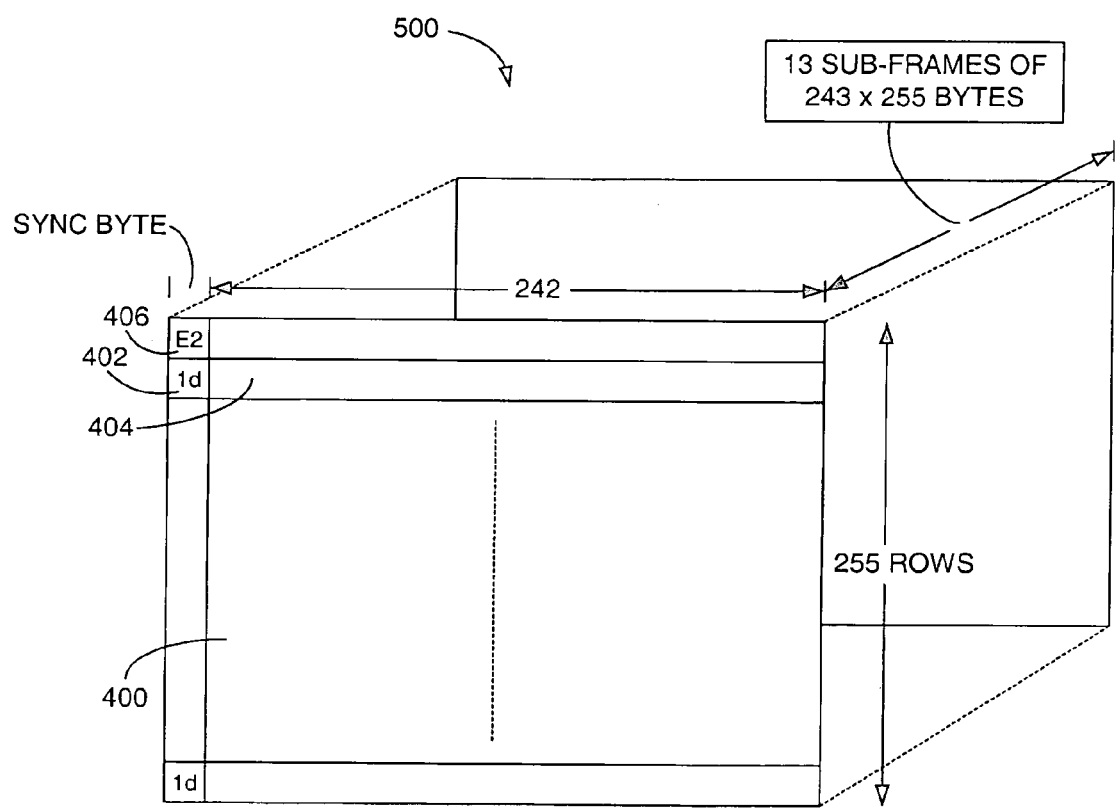
FIG. 5 is a diagram of a super data frame

Referring to FIG. 5, the super frame formatter 102 completes formatting by arranging the sub-frames 400 into a super frame 500. The super frame 500 may comprise a predetermined number of sub-frames 400. In the preferred embodiment, each super frame 500 may comprise thirteen (13) sub-frames 400. Other numbers of sub-frames 400 may be grouped into other sized super frames 500. By defining two hundred forty-two (242) data bytes per block 404, two hundred fifty-five (255) blocks 404 per sub-frame 400, and thirteen (13) sub-frames 400 per super frame 500, then there are 242 data bytes/block×255 blocks/sub-frame×13 sub-frame/super frame 802, 230 data bytes per super frame 500. Note that the data bytes of one data frame 300 map one-for-one into the data bytes of one super frame 500.

The super frames 500 may be provided as a block stream to the encoder 104 for error protection encoding. The encoder 104 is also called an outer encoder in the direct broadcast satellite field. In the preferred embodiment, the encoder 104 may be a Reed-Solomon (RS) encoder of length 255 and error correcting capability T=6. This means that a systematic code word produced by the encoder 104 contains twelve (12) check bytes after each two hundred forty-three (243) data bytes of each block 404. Reed-Solomon encoding generally operates to convert the block stream received from the super frame formatter 102 into an error protected block stream.

Preferably, the RS(255, 243) code has the same generator and binary primitive polynomials as the DVB-S code RS(204, 188) and DSS® code RS(146, 130). In particular, the RS(204, 188) code may use the code generator polynomial shown in equation 1, and the binary primitive polynomial shown in equation 2.

$$g(x)=(x+\lambda^0)(x+\lambda^1)(x+\lambda^{15}), \text{ where } \lambda=02 \text{ hex.} \quad \text{Eq. (1)}$$

$$p(x)\ x^8+x^4+x^3+x^2+1 \quad \text{Eq. (2)}$$

Figure 6:
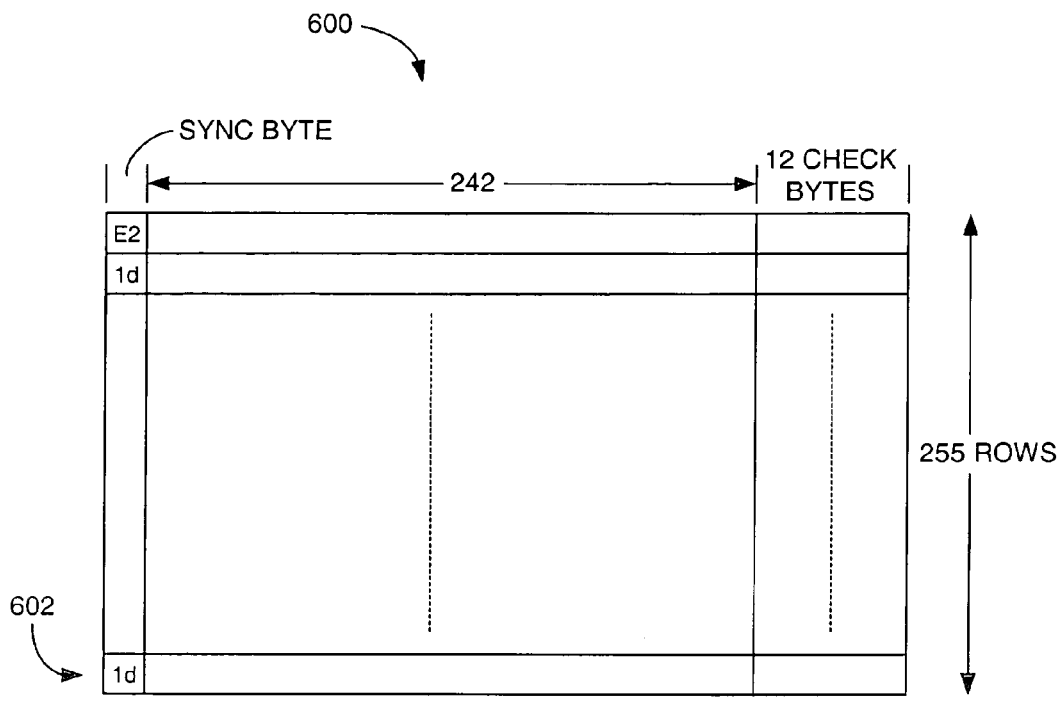
FIG. 6 is a diagram of a sub-frame.

Referring to FIG. 6, the error protected sub-frame 600 that results from Reed-Solomon encoding generally has two hundred fifty-five (255) RS systematic code words 602. Each RS systematic code word 602 is two hundred fifty-five (255) bytes in length. Consequently, each error protected sub-frame 600 has 255 words×255 bytes/word=65,025 bytes. Viewed another way, each error protected sub-frame 600 has two hundred fifty-five (255) synchronization bytes+61,710 data bytes+3,060 check bytes. The error protected sub-frame 600 output from the encoder 104 is referred to as an error protected block stream.

The interleaver 106 may perform a 255×255 block interleave function on each error protected sub-frame 600. Interleaving may be performed in order to decimate any error events created by a turbo decoder in a channel decoder (e.g., a set-top box satellite receiver) at the receiving end of the satellite transmission. Any noise pulses and/or burst errors encountered in adjacent blocks of the signal at a receiving end are rearranged into non-adjacent blocks during a de-interleaving operation. The interleaving operation may be synchronized to the inverted synchronization byte 406 from the beginning of the first RS systematic code word 602 of the error protected sub-frame 600.

Figure 7:
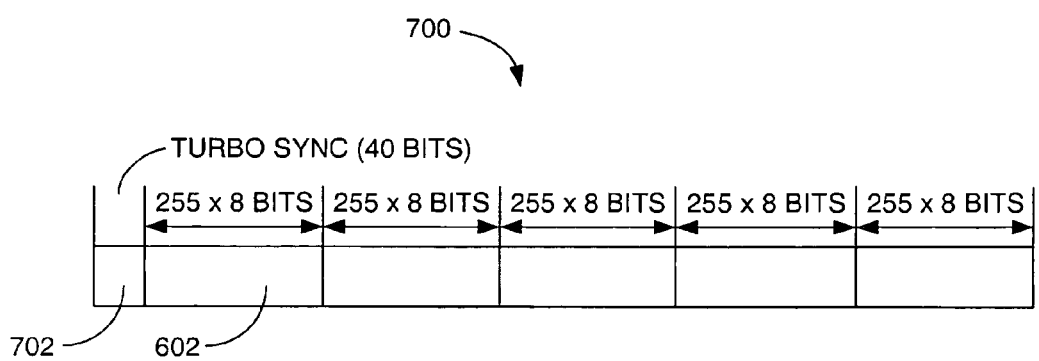
FIG. 7 is a diagram showing turbo synchronization insertion.

Referring to FIG. 7, the turbo synchronization inserter 108 generally operates on the error protected block stream prior to an inner encoding operation performed by the variable rate turbo encoder 110. The turbo synchronization inserter 108 may add multiple synchronization bits 702 before each predetermined number of error protected blocks 602. In the preferred embodiment there are generally forty (40) synchronization bits 702 added for every five (5) error protected blocks 602. Other combinations of synchronization bits 702 and predetermined numbers of error protected block 602 may be used within the scope of the present invention.

The resulting collection of synchronization bits 702 and predetermined number of error protected block 602 is referred to as a turbo code word 700. Each turbo code word 700 may be 40 bits+(5 words×255 bytes/word×8 bits/byte)=10,240 bits in length. This 10,240 bit length generally defines a bit interleave operation within the variable rate turbo encoder 110 that will be discussed next.

Figure 8:
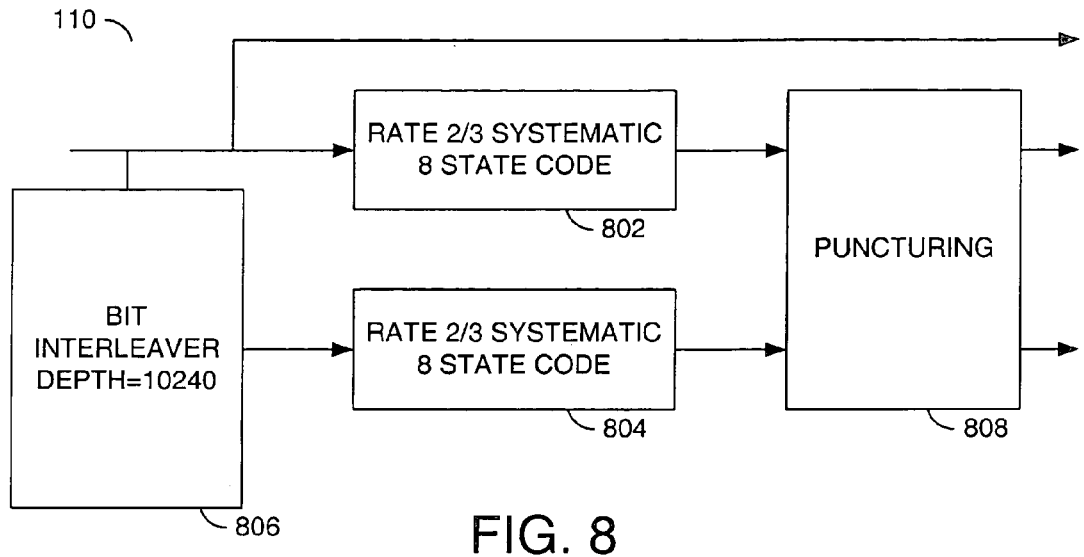
FIG. 8 is a block diagram showing detail of a turbo encoder.

Referring to FIG. 8, the variable rate turbo encoder 110 architecture may comprise two convolutional encoders 802 and 804, a bit interleaver 806 and a puncturing module 808. In the preferred embodiment, the convolutional encoders 802 and 804 may be rate 2/3 systematic 8 state encoders having an octal generator as shown in equation 3. However, the encoding need not be restricted to this description. Implementation issues may necessitate the choice of codes that are simpler to implement that may have similar, or slightly reduced performance. For example, a rate 1/2 systematic 8 state encoder with octal generators (13, 17), as shown in equation 4, may yield a less computationally complex architecture.

$$G_{2\times 3} = \begin{bmatrix} 1 & 0 & D^3 + \dfrac{D^2}{D^3} + D + 1 \\ 0 & 1 & D^3 + D^2 + \dfrac{1}{D^3} + D + 1 \end{bmatrix} \quad \text{Eq. (3)}$$

$$G_{1\times 2} = \begin{bmatrix} 1 \dfrac{(1+D+D^2+D^3)}{(1+D+D^3)} \end{bmatrix} \quad \text{Eq. (4)}$$

The error protected block stream may be provided to the first convolutional encoder 802 and the bit interleaver 806. The first convolutional encoder 802 generally operates on the turbo code words 700 within the error protected block stream to produce a first redundancy stream. The bit interleaver 806 may interleave each turbo code word 700 to produce a second data stream. The second data stream may be provided to the second convolutional encoder 804. The second convolutional encoder 804 generally operates on each interleaved turbo code word to produce a second redundancy stream.

Referring to FIGS. 9a–9e, the puncturing module 808 may provide a variable rate capability to the variable rate turbo encoder 110 by puncturing the redundancy bits in the first and second redundant streams. S1 denotes the error protected block stream, P1 denotes the first redundant stream, and P2 denotes the second redundant stream. FIGS. 9a–e shows the bits punctured pattern for rates 2/3, rate 5/6, rate 8/9, rate 8/9 and rate 1/2. An "X" indicates the punctured bits in FIGS. 9a–e.

Figure 10:
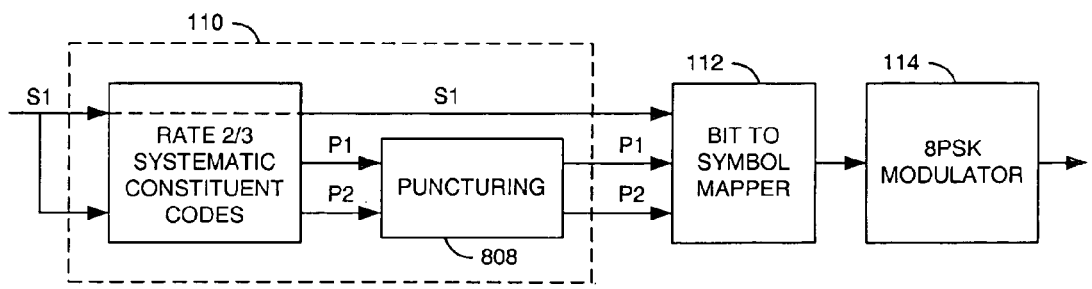
FIG. 10 is a block diagram of a portion of an encoder channel.

Referring to FIG. 10, the error protected block stream S1, and the first and second punctured redundant streams P1' and P2' may be presented to the bit-to-symbol mapper 112. After mapping, the resulting symbol stream may be modulated by the modulator 114. The modulator 114 generally presents a signal suitable for transmission in the satellite channel.

Figure 11:
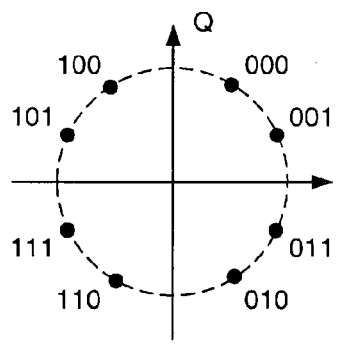
FIG. 11 is a diagram of an 8PSK mapping.
Figure 9A:
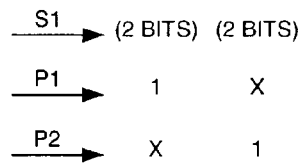
FIGS. 9a–e are puncturing patterns.
Figure 9B:
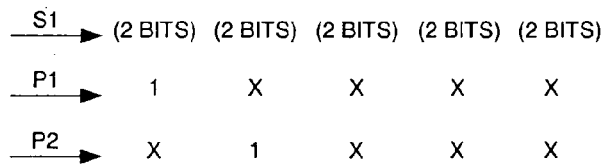
Figure 9C:
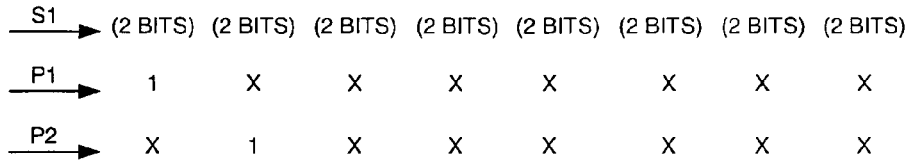
Figure 9D:
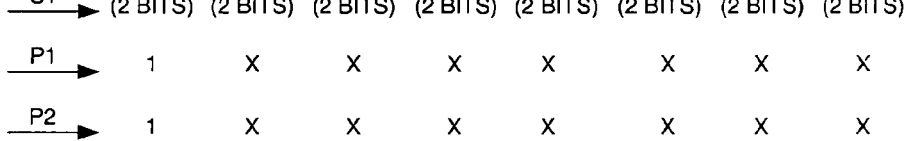
Figure 9E:
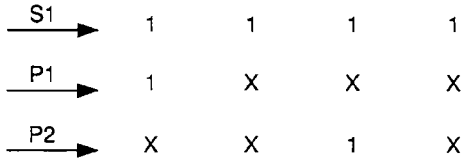

Referring to FIG. 11, the bit-to-symbol mapping may be implemented such that the cosets provided by the punctured redundant streams P1' or P2' are Gray mapped. In the preferred embodiment, there may be eight (8) different symbols possible in the symbol stream. Each symbol may comprise two error protected block stream bits for the two most significant bits, and an alternative use of the punctured redundancy streams P1' or P2' for the least significant bit. Other bit-to-symbol mappings may be used to meet the design criteria of a particular application. As an example, the two error protected block stream bits may be used as the two least significant bits while the punctured redundancy streams P1' or P2' are used for the most significant bit.

Gray mapping arranges the eight symbols so that no more than one bit is changed between adjacent symbols in an 8PSK modulation scheme. Other mappings may be used to facilitate other error detection and correction mechanisms. As an example, a bit-interleaved coded modulation (BICM) with iterative decoding method may be employed. The BICM approach is described in papers "Bit-Interleaved Coded Modulation with Iterative Decoding", by Ritcey et al. (published in the IEEE Communications Letters, Vol. 1, No. 6, November 1997, the Institute of Electrical and Electronics Engineering, New York, N.Y.) and "Bit-Interleaved Coded Modulation with Iterative Decoding—Approaching Turbo-TCM Performance without Code Concatenation", by Ritcey et al. (published in the Proceedings 1998 Conference on Information and System Science, March 1998, Princeton University Press, Princeton, N.J.), incorporated herein by reference in their entirety. Other mappings approaches may be used where the bit streams are altered or scrambled prior to modulation to meet the design criteria of a particular application.

The bit-to-symbol mapper 112 may transform the encoded stream into another symbol stream having other than eight symbols. The modulator 114 may modulate the symbol stream using other than PSK. For example, the bit-to-symbol mapper 112 and modulator 114 may transform the encoded stream into another signal using eight quadrature amplitude modulation (8QAM). Likewise, 16QAM, 32QAM, 64QAM and the like may also be employed within the scope of the present invention. Other examples of different PSK modulation schemes include, but are not limited to, 2PSK, 4PSK, and 16 PSK.

Figure 12:
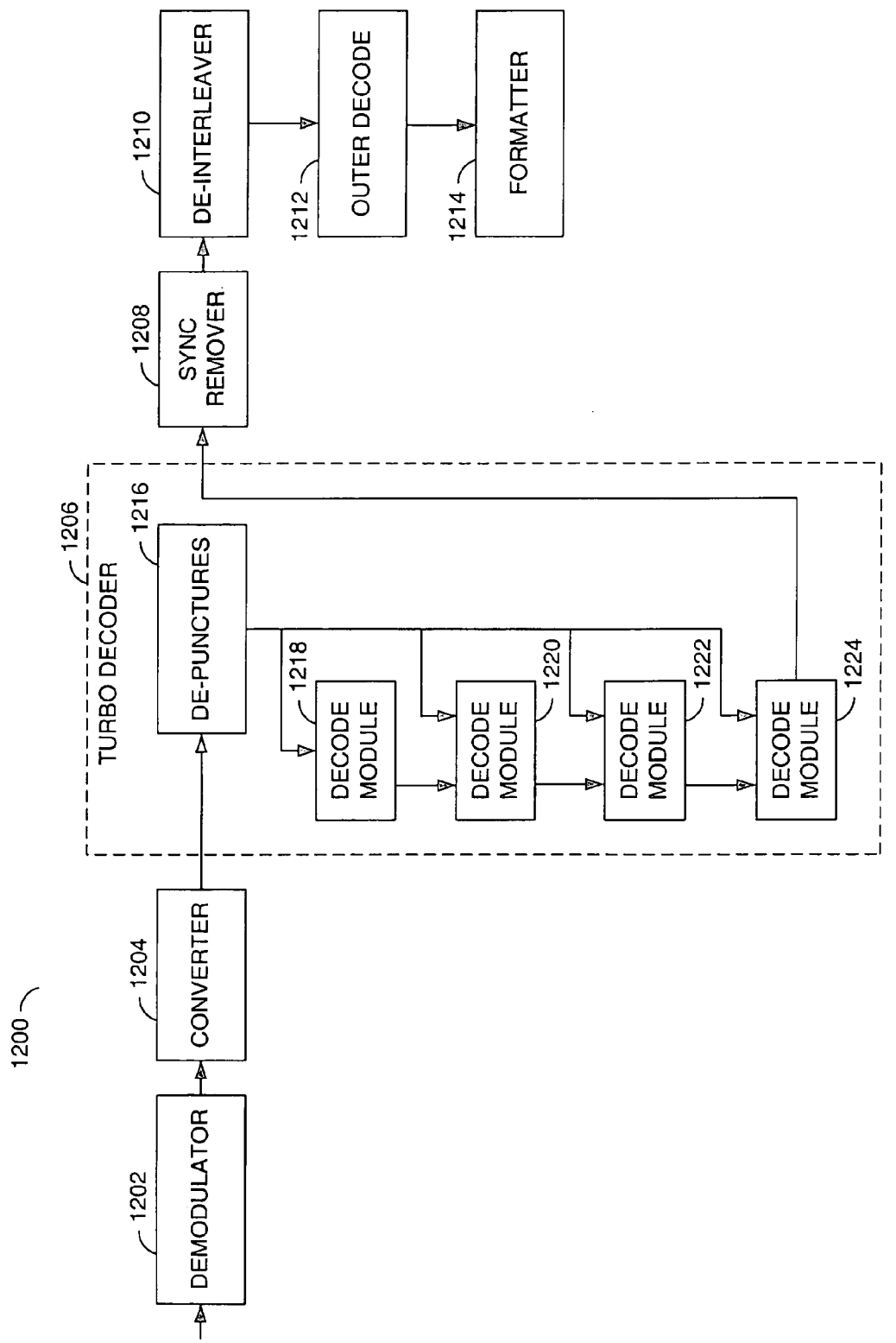
FIG. 12 is a block diagram of an example channel decoding system that implements the present invention.

FIG. 12 shows a block diagram of an example channel decoding system 1200 implemented in accordance with the present invention. The channel decoding system 1200 generally comprises a demodulator 1202, a converter 1204, a turbo decoder 1206, a synchronization remover 1208, a de-interleaver 1210, an outer decoder 1212 and a formatter 1214. Each of these blocks 1202–1214 generally performs the inverse of the blocks 102–114 of the channel encoding system 100.

The demodulator 1202 may receive the signal generated by the channel encoding system 100 and reproduce the symbol stream as an output. In the preferred embodiment, the symbols stream generally defines eight different symbols, as shown in FIG. 11, although other numbers of symbols may be used in different embodiments. The converter 1204 may convert the symbol stream into the encoded stream.

The turbo decoder 1206 is generally responsible for converting the encoded stream into the error protected block stream. Turbo decoder 1206 may include a de-puncture module 1216 for replacing the punctured bits removed by the puncture module 808. Multiple decode modules 1218–1224 transform the systematic stream and the redundant stream into the error protected block stream. Details of this operation may be found in the previously referenced U.S. Pat. No. 5,446,747.

The synchronization remover 1208 may remove the synchronization signals from the error protected block stream that were inserted by the synchronization inserter 108. The de-interleaver 1210 generally rearranges the error protected block stream to restore the original block order presented by the encoder 104 of the channel encoding system 100. The outer decoder 1212 may correct for errors present in the error protected block stream, and remove the error protection. Finally, the formatter 1214 may rearrange the block stream presented by the outer decoder 1212 to produce the original transport stream that was presented to the channel encoding system 100.

The transport stream entering the channel encoding system 100 and exiting the channel decoding system 1200 may contain multiple HDTV programs. Multiplexing and demultiplexing of the multiple HDTV programs into and out of the transport stream may take place outside of the channel encoding system 100 and the channel decoding system 1200 respectively. Unique identification tags may be associated with the data bytes of the different programs prior to multiplexing the programs together. After the channel decoding system 1200, these unique identification tags generally allow the programs to be distinguished from each other.

Figure 13:
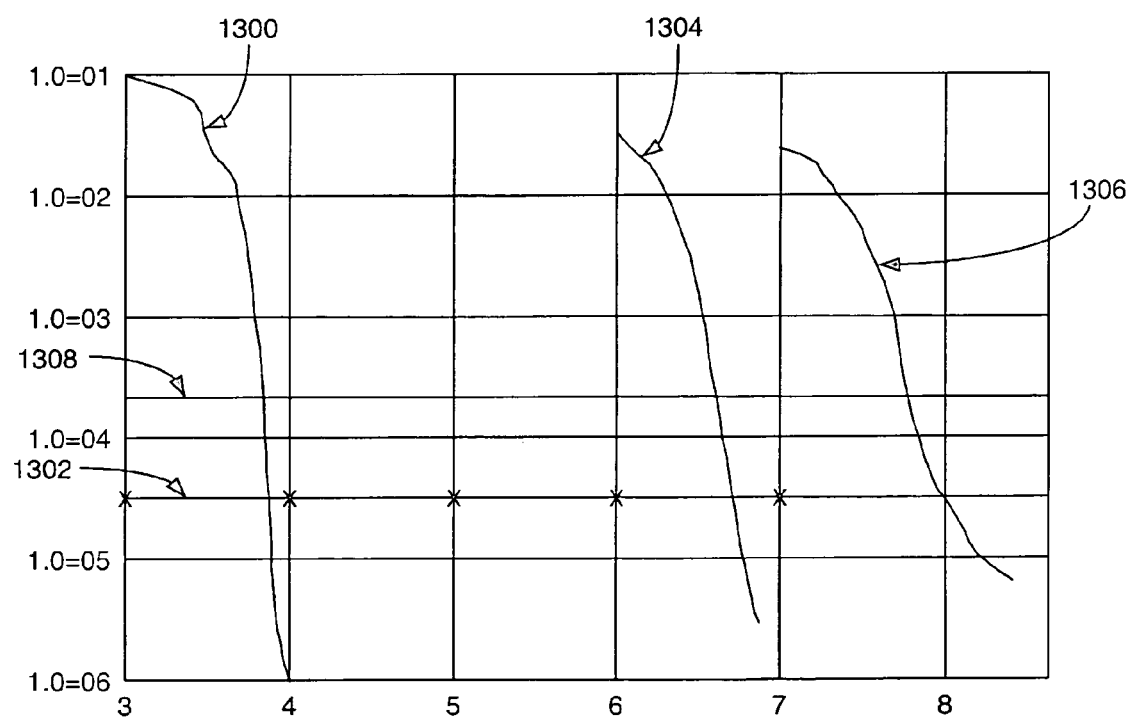
FIG. 13 is a graph of a simulated bit error rate verses a signal to noise ratio.

Referring to FIG. 13, the encoder 104 was defined as RS(255, 243) in the example embodiment for the channel encoding system 100 shown in FIG. 1. The bit error rate of the turbo encoder 110 was set according to a performance of the encoder 104 to achieve a desired signal-to-noise (SNR) ratio at 21.5 mega-samples per second (MSps). Here, the SNR is defined as a ratio of an energy per bit (Eb) to a noise at the demodulator (No). The 21.5 MSPS provides approximately 41 megabits per second (Mbps) at rate 2/3 (curve 1300 in FIG. 13) to accommodate two HDTV programs. Simulation results indicate that the turbo decoder 110 requires a BER of approximately $3 \times 10^{-5}$ (line 1302) to achieve the desired SNR. Rate 5/6 (curve 1304) and rate 8/9 (curve 1306) are provided in FIG. 13 for comparison.

The BER required for the turbo encoder 110 was also simulated using an RS(204, 188) encoder as defined by the DVB-S specification. In this case, the symbol rate is changed to 22.5 MSPS at rate 2/3 to achieve the approximately 41 Mbps bit rate. Results of the simulation show that the RS(204, 188) encoding provides slightly better performance than RS(255, 243) encoding. Consequently, the turbo encoder 110 following an RS(204, 188) encoding only requires a BER of approximately $2 \times 10^{-4}$ (line 1308) to achieve the desired SNR.

A summary of target system performance specifications is provided in the following Table 1:

TABLE 1

| No. | Item | Typical Value | Unit |
|---|---|---|---|
| 1 | Payload | 41 | Mbps |
| 2 | Symbol Rate | 21.5 | MSps |

TABLE 1-continued

| No. | Item | Typical Value | Unit |
|-----|------|---------------|------|
| 3 | Dish Size | 46 | cm |
| 4 | Eb/No @ 10E-11 (Q.E.F.) | 5.5 | dB |

This summary assumes two HDTV programs are multiplexed into the transport stream substantially simultaneously. A quasi-error free (QEF) Eb/No ratio of $10^{-11}$ may be achieved using a standard eighteen inch (forty-six millimeter) dish at the receiving end.

While the invention has been particularly shown and described with reference to the preferred embodiments thereof, it will be understood by those skilled in the art that various changes in form and details may be made without departing from the spirit and scope of the invention.

What is claimed is:

1. A system comprising:
    a formatter configured to format a plurality of data frames received in a transport stream by inserting a plurality of synchronization data into said data frames to produce a block stream;
    an error correction encoder configured to encode said block stream to produce an error protected block stream;
    an interleave module configured to interleave said error protected block stream to produce a data stream;
    an inserter configured to insert a synchronization signal into said data stream; and
    a turbo encoder configured to encode said data stream to produce an encoded stream.

2. The system according to claim 1, wherein said transport stream defines two high definition television programs substantially simultaneously.

3. The system according to claim 1, wherein said turbo encoder comprises:
    a first systematic encoder configured to encode said data stream to produce a first redundant stream;
    a bit interleave module configured to interleave said data stream to produce a second data stream; and
    a second systematic encoder configured to encode said second data stream to produce a second redundant stream.

4. The system according to claim 3, wherein said turbo encoder further comprises:
    a puncture module configured to puncture bits from said first redundant stream and said second redundant stream to produce a redundant portion of said encoded stream.

5. The system according to claim 1, further comprising:
    a bit-to-symbol mapper configured to map said encoded stream to produce a symbol stream carrying a plurality of symbols each consisting of two error protected bits and one redundant bit.

6. A method for transmitting comprising the steps of:
    (A) formatting a plurality of data frames received in a transport stream by inserting a plurality of synchronization data into said data frames to produce a block stream;
    (B) error correction encoding said block stream to produce an error protected block stream;
    (C) interleaving said error protected block stream to produce a data stream;
    (D) inserting a synchronization signal into said data stream; and
    (E) turbo encoding said data stream to produce an encoded stream.

7. The method according to claim 6, wherein said transport stream defines two high definition television programs substantially simultaneously.

8. The method according to claim 6, further comprising the steps of:
    encoding said data stream to produce a first redundant stream;
    interleaving said data stream to produce a second data stream; and
    encoding said second data stream to produce a second redundant stream.

9. The method according to claim 8, further comprising the step of:
    puncturing bits from said first redundant stream and said second redundant stream to produce a redundant portion of said encoded stream.

10. The method according to claim 6, wherein said turbo encoding has a bit error rate not greater than 2 errors per 10,000 bits.

11. A system comprising:
    a converter configured to convert a symbol stream comprising a plurality of symbols into an encoded stream;
    a turbo decoder configured to decode said encoded stream to produce a data stream;
    a synchronization remover configured to remove a synchronization signal from said data stream;
    a de-interleave module configured to arrange said data stream into an error protected block stream;
    an error correction decoder configured to decode said error protected block stream to produce a block stream; and
    a formatter configured to remove a plurality of synchronization data from a plurality of data frames within said block stream to produce a transport stream.

12. The system according to claim 11, wherein said symbol stream defines two high definition television programs substantially simultaneously.

13. The system of claim 11, wherein said turbo decoder comprises:
    a plurality of decode modules configured to decode said encoded stream to produce said data stream.

14. The system according to claim 13, wherein said turbo decoder further comprises:
    a de-puncture module configured to de-puncture a redundant portion of said encoded stream.

15. The system according to claim 11, further comprising:
    a demodulator configured to demodulate a signal to produce said symbol stream wherein each of said symbols consists of two error protected bits and one redundant bit.

16. A method for receiving comprising the steps of:
    (A) converting a symbol stream comprising a plurality of symbols into an encoded stream;
    (B) turbo decoding said encoded stream to produce a data stream;
    (C) removing a synchronization signal from said data stream;
    (D) arranging said data stream into an error protected block stream;
    (E) decoding said error protected block stream to produce a block stream; and (F) removing a plurality of synchronization data from a plurality of data frames within said block stream to produce a transport stream.

17. The method according to claim 16, wherein said symbol stream defines two high definition television programs substantially simultaneously.

18. The method according to claim 16, wherein step (B) further comprises the sub-step of:

decoding said encoded stream in a plurality of modules to produce said data stream.

19. The method according to claim 18, further comprising the step of:

de-puncturing a redundant portion of said encoded stream.

20. The method according to claim 16, wherein said turbo decoding has a bit error rate not greater than 3 errors per 100,000 bits.

* * * * *